United States Patent [19]

Yasui et al.

[11] Patent Number: 4,523,862

[45] Date of Patent: Jun. 18, 1985

[54] TAPERED ROLLER BEARING

[75] Inventors: Hiroyoshi Yasui; Teruo Yoshida, both of Nara; Hiroshi Ueno, Osaka; Katsunori Tsumura, Nara, all of Japan

[73] Assignee: Koyo Seiko Company Limited, Osaka, Japan

[21] Appl. No.: 574,962

[22] Filed: Jan. 30, 1984

[30] Foreign Application Priority Data

Jun. 28, 1983 [JP] Japan .......................... 58-100350[U]

[51] Int. Cl.³ ...................... F16C 33/46; F16C 33/58
[52] U.S. Cl. .................................. 384/564; 384/571; 384/572; 384/576
[58] Field of Search ............... 384/564, 571, 572, 576, 384/569

[56] References Cited

U.S. PATENT DOCUMENTS

| | | | |
|---|---|---|---|
| 1,365,763 | 1/1921 | Baker | 384/571 |
| 3,477,773 | 11/1969 | Alton. | |
| 4,136,916 | 1/1979 | Musselman et al. | 384/576 |
| 4,317,601 | 3/1982 | Faigley | 384/576 |

*Primary Examiner*—Lenard A. Footland
*Attorney, Agent, or Firm*—Mason, Fenwick & Lawrence

[57] ABSTRACT

An improved tapered roller bearing in which a shoulder at a small diameter end side of an inner race has been eliminated. A shoulder portion for maintaining a state of engagement between an inner race and a cage for holding tapered rollers at circumferentially equally spaced positions after assembling, is formed at an outer peripheral portion of a large diameter side of the inner race. Furthermore, projections for engagement with the shoulder portion are formed in positions not hindering the assembling of the tapered rollers at the large diameter side of the cage.

14 Claims, 12 Drawing Figures

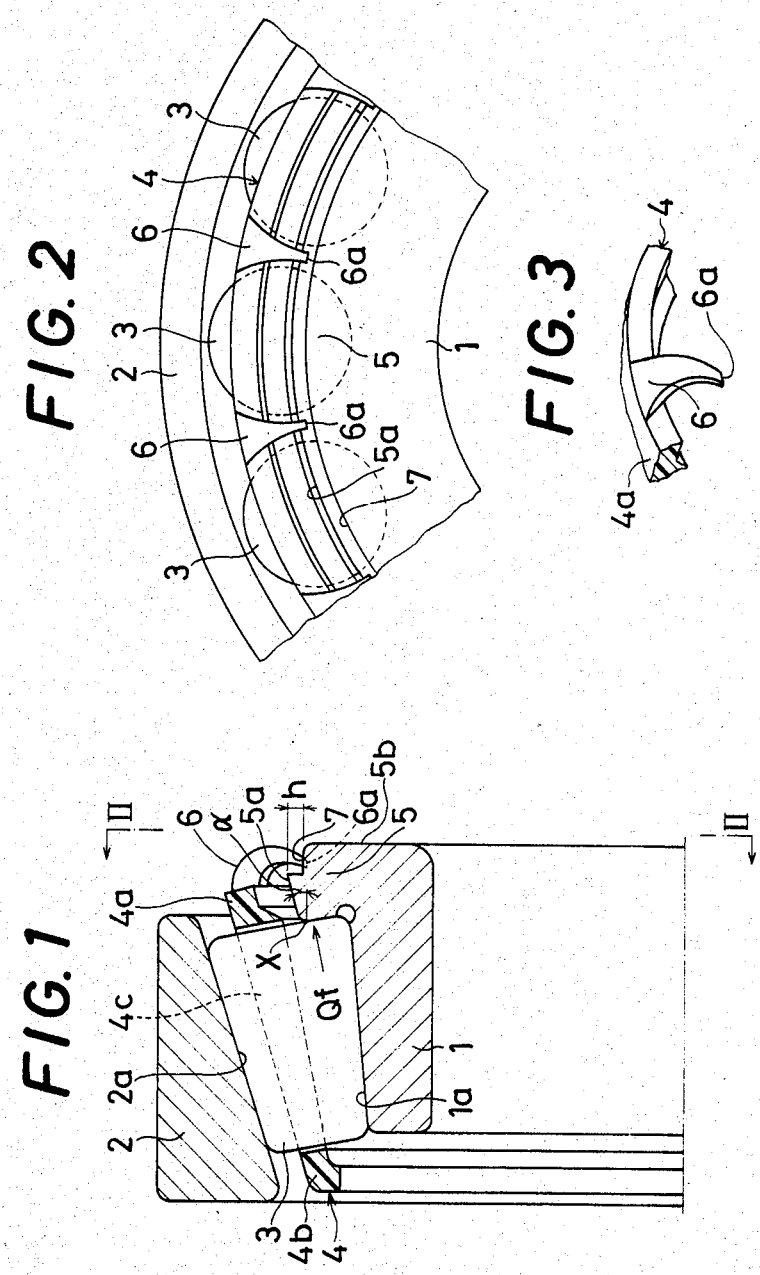

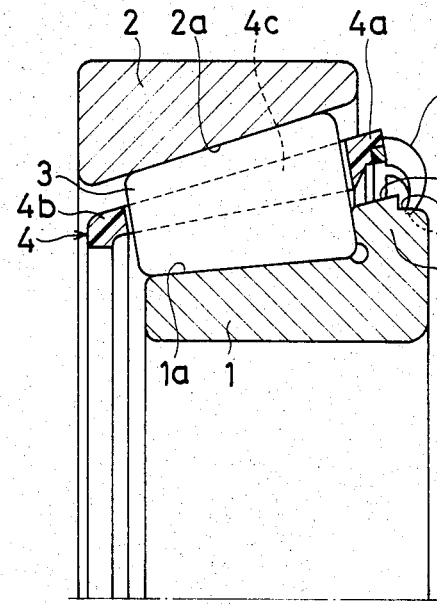
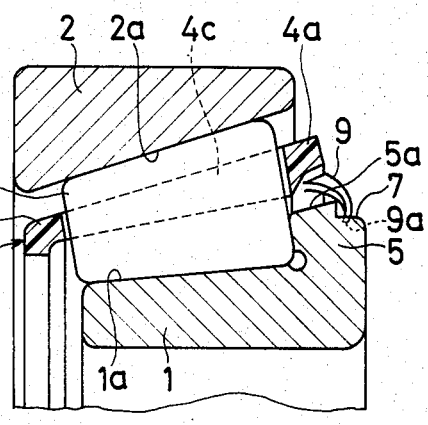
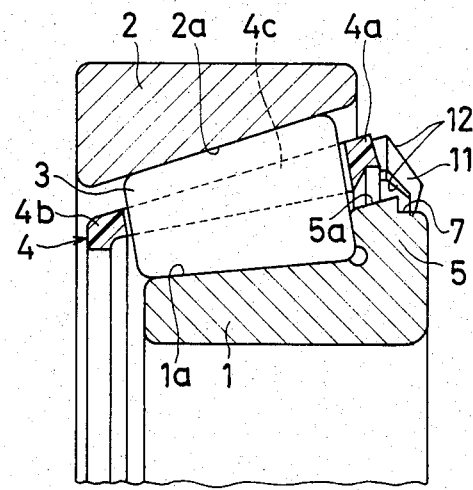
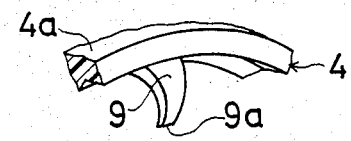
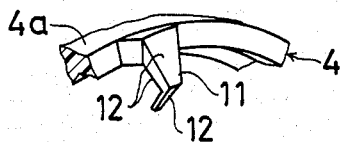

TAPERED ROLLER BEARING

BACKGROUND OF THE INVENTION

The present invention generally relates to a bearing and more particularly, to an improved tapered roller bearing.

Conventionally, a tapered roller bearing is formed with a large shoulder at a large diameter portion of an inner race, and a small shoulder at a small diameter portion thereof respectively. The large shoulder receives an axial thrust load acting on the bearing during rotation for guiding the rotation of the tapered rollers. On the contrary, although not particularly necessary for the function of the bearing during rotation thereof, the small shoulder is essential to prevent respective parts from separation after the inner race, tapered rollers and a cage have been assembled with each other, and has for its object to obstruct the axial movement of the tapered rollers after the assembling.

However, formation of such a small shoulder complicates the processing of the inner race, with a simultaneous reduction of the material yield, while, due to the fact that the length of the small shoulder is added to that of the inner race, the tapered roller bearing is undesirably increased in its size in the axial direction thereof, with a consequent increase in its weight also.

Incidentally, bearings are widely employed as basic parts for various mechanical arrangements, but, owing to the recent requirements for compact size and light weight of bearings, it has now became rather difficult to fully meet the purpose by the conventional bearings as described above.

INFORMATION DISCLOSURE

A. U.S. Pat. No. 3,477,773 to R. Alton Patented Nov. 11, 1969

In this prior art tapered roller bearing, it is so arranged that a plurality of tapered rollers are disposed between an inner race and an outer race respectively having tapered tracks, while the tapered rollers are held in positions circumferentially spaced at equal intervals by a cage 18 made of a synthetic resin. On the other hand, only at a large diameter portion of the inner race 14, a shoulder 26 for guiding the tapered rollers is provided, and the outer diameter face of said shoulder is formed into a frustoconical or inclined surface 32. Moreover, at positions corresponding to portions between the tapered rollers of a large diameter side annular portion of said cage 18, there are provided radially and inwardly extending lugs or projections 50 which are engaged with the inclined surface 32 of said shoulder so as to maintain non-contact during rotation of the bearing. By the above arrangement, it is intended to prevent the inner race, cage and tapered rollers from separation after the assembling. Through adoption of the construction as described above, the small shoulder at the small diameter portion of the inner race which has been conventionally required is dispensed with, for light weight and compact size of the bearing, but this known tapered roller bearing has structural drawbacks as follows, and is not considered to be fully satisfactory from the viewpoint of performance.

More specifically, since the frusto-conical surface 32 provided on the tapered roller guiding shoulder for the large diameter portion of the inner race is formed into a configuration in which a diameter is gradually reduced outwardly from the largest diameter portion of the shoulder, in the case where the inner race is mounted into an assembly of the cage 18 and the tapered rollers 16, it is difficult for the projections 50 to go over the shoulder, since said projections 50 of the cage 18 first contact the portion having the largest diameter of the shoulder for the inner race, thus presenting a difficulty in the assembling of the bearing. If it is intended to forcibly mount the inner race into the assembly, there is a possibility that the projections 50 may be broken. Moreover, due to the fact that the frusto-conical surface 32 of the shoulder is inclined in the direction as described earlier, the strength of the shoulder of this bearing is low as compared with the conventional type bearing in which the shoulders are respectively provided on the large diameter portion and the small diameter portion of the inner race.

Furthermore, the cage 18 made of a synthetic material may be subjected to shrinkage by the circumstantial variations in temperatures and humidities, and in such a case, the projections 50 of the cage 18 may come into contact with the frusto-conical surface 32 of the shoulder 26. Since each of the projections 50 is formed to have the same width from the base portion to its end portion, the contact area is undesirably increased, thus resulting in an increase in the rotational torque of the bearing.

Additionally, when the tapered rollers 16 are assembled from the inner diameter side of the cage 18, in an automatic assembling work, each of the tapered rollers is first axially inserted from the large diameter side of the cage 18 towards the inner diameter side of said cage, and thereafter, assembled into each window 40. In the above case, each of the tapered rollers 16 is required to be axially moved through between said projections so as not to interfere with such projections 50. However, since the projections 50 have the construction as described earlier, the circumferential interval between the projections 50 is inavitably increased, and thus, the number of the windows 40 can not be increased, with the number of the tapered rollers being undesirably limited. Therefore, it is impossible to increase the rated load of the bearing.

SUMMARY OF THE INVENTION

Accordingly, it is a primary object of the present invention to provide an improved tapered roller bearing which is capable of substantially eliminating disadvantages inherent in the conventional tapered roller bearings of this kind.

It is another important object of the present invention to provide a tapered roller bearing of the above described type which is simple in construction and highly reliable in performance, and can be readily manufactured at low cost.

For accomplishing these objects, according to one preferred embodiment of the present invention, there is provided an improved tapered roller bearing which includes an inner race and an outer race respectively having tapered tracks, a plurality of tapered rollers disposed between said inner race and said outer race, and held in circumferentially equally spaced positions by a cage made of a synthetic resin, a shoulder for guiding the tapered rollers, provided only at a large diameter portion of said inner race, and projections for engagement with said shoulder, formed on a large diameter side annular portion of said cage at the same positions as for the circumferentially disposed bars of the cage, i.e. at positions corresponding to the portion between the tapered rollers, and which is characterized in that the projections provided on the large diameter side annular portion of said cage are each formed into such a shape as is folded radially and inwardly at its forward end portion, with a width and a thickness of said projection being gradually reduced from its base portion towards the forward end for a pointed or converging shape of said projection, and said shoulder is formed, at its outer peripheral face, with an inclined face having its diameter gradually increased from an inner side of the bearing towards its outer side, and an engaging portion also formed in said shoulder for engagement with said projections, so that the forward ends of said projections are engaged with said engaging portion so as to maintain non-contact with respect to said shoulder during rotation of the bearing.

These objects, features and effects of the present invention will become apparent from the following description of the embodiments to be given hereinbelow.

BRIEF DESCRIPTION OF THE DRAWINGS

FIG. 1 is a fragmentary side sectional view of an improved tapered roller bearing according to one preferred embodiment of the present invention, FIG. 2 is a fragmentary front elevational view of the tapered roller bearing of FIG. 1 as observed in the direction of an arrow A, FIG. 3 is a fragmentary perspective view of a projection of a cage employed in the arrangement of FIG. 1, FIG. 4 is a view similar to FIG. 1, which particularly shows another embodiment of the present invention, FIGS. 5 and 7 are views similar to FIG. 1, which particularly show further embodiments of the present invention, FIG. 6 is a fragmentary perspective view of a projection employed in the embodiment of FIG. 5, FIG. 8 is a fragmentary perspective view of a projection employed in the embodiment of FIG. 7 and, FIGS. 9, 10, 11 and 12 are each fragmentary sectional views illustrating engaging portions according to still further embodiments according to the present invention.

DESCRIPTION OF PREFERRED EMBODIMENTS

Figure 9:
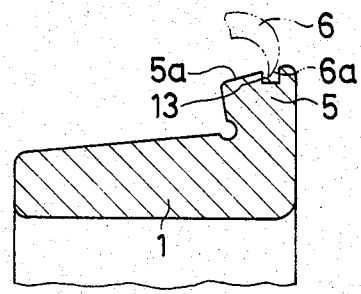

Referring now to the drawings and particularly to FIGS. 1 through 3, there is shown an improved tapered roller bearing according to one preferred embodiment of the present invention, which includes an inner race 1 and an outer race 2 respectively having tapered pathways or tracks 1a and 2a, and a plurality of tapered rollers 3 disposed between said inner race 1 and outer race 2 so as to be held at circumferentially equally spaced positions by a cage 4 made of a synthetic resin. The inner race 1 has a shoulder 5 provided only at its large diameter portion for guiding the tapered rollers 3, and is not provided with any shoulder at its small diameter portion. The outer peripheral surface 5a of said shoulder 5 is formed to have an inclined surface at an angle α, with its diameter increasing from the inner side of the bearing towards the outer side thereof.

Meanwhile, the cage 4 made of the synthetic resin has a plurality of cage bars 4c provided at positions circumferentially equally spaced, and annular connecting portions 4a and 4b respectively provided at the large diameter side and the small diameter side of said cage, which are molded into an integral structure. At the outer end face of the large diameter side annular connecting portion 4a, and in positions between windows for the respective tapered rollers 3, there are integrally formed projections 6, each of which has a forward end 6a bent radially and inwardly so as to be directed towards the interior of the bearing. The projection 6 has its width and thickness at its forward end portion 6a to be gradually reduced from the base portion towards the forward end to provide a pointed shape for the projection 6, with the width at its base being made to be smaller than an interval between the neighboring tapered rollers 3. Meanwhile, the inner and outer faces of said projection 6 are formed into curved faces formed by arcs in an axial cross section of said cage.

It is to be noted here, however, that the configuration of the projection is not limited to the shape in which the forward end portion thereof is bent radially and inwardly to be directed into the bearing as described in the above embodiment, but may be of such a shape in which the forward end is folded or bent at least radially and inwardly. It should also be noted that the projections 6 may be provided at all the portions between the respective tapered rollers 3 or at suitable several portions thereof, and thus, the number of projections to be provided may be selected is desired.

On the other hand, at an outer shoulder portion of the outer peripheral face 5a of said shoulder 5 for the inner race 1, there is formed a peripheral stepped portion 7 as an engaging portion for the forward ends 6a of the projections 6. The forward ends 6a of the projections 6 of the cage 4 are engaged with the peripheral stepped portion 7 so that the assembly of the cage 4 and the tapered rollers 3 and the inner race 1 are not separated from each other during handling of the bearing before assembling thereof into appliances. In the above case, the forward end portions 6a of the projections 6 and the peripheral stepped portion 7 are arranged to be maintained out of contact or non-contact during rotation of the bearing.

By the foregoing embodiment, since the forward end portions 6a of the projections 6 of the cage 4 are bent radially and inwardly so as to be directed into the bearing for providing the pointed configuration, in the case where the tapered rollers 3 held on the cage 4 are assembled into the inner race 1, the projections 6 are readily deformed so as to go over the outer peripheral surface 5a of the shoulder 5 for engagement with the peripheral stepped portion 7.

Moreover, owing to the fact that the outer peripheral surface 5a of the shoulder 5 is formed into the inclined face, the height h of the peripheral stepped portion 7 may be provided to be sufficiently large, even if the overall height of the shoulder 5 is not made large. Accordingly, the amount of engagement between the forward ends 6a of the projections 6 for the cage 4 and the peripheral stepped portion 7 becomes large, and furthermore, the increase of the moment load Qf acting on the shoulder 5 by the increase of the height of the shoulder 5, and the increase of the bearing weight may be avoided, which effect is advantageous for improvement of bearing life and also for weight reduction of the bearing. Additionally, for avoiding any loss in strength of the shoulder 5, the bottom surface of the peripheral stepped portion 7 is so arranged as to be at the same position, approximately in the axial direction, as the maximum height point X of the tapered roller guide face of the shoulder 5.

It should be noted that similar consideration is also given in the embodiments to be described later.

Furthermore, in the case where the assembly of the cage 4 and the tapered rollers 3 and the inner race 1 are assembled into one unit, since the outer peripheral surface 5a of the shoulder 5 is formed into the inclined surface having its diameter increasing from the inner side of the bearing towards the outer side thereof, the forward ends 6a of the projections 6 for the cage 4 are readily engaged with the peripheral stepped portion 7 along said inclined surface, and thus, the assembling work is much facilitated.

In FIG. 4, there is shown another embodiment according to the present invention in which the annular connecting portion 4a at the large diameter side of the cage 4 and the projections 8 are molded into separate members, and thereafter, both of these members 4a and 8 are subjected to the socket coupling by applying a bonding agent and the like or combined into one unit by fusion and contact under pressure, etc., with the forward ends 8a of the projections 8 engaged with the peripheral stepped portion 7. By the above construction, even when the height of the shoulder 5 of the inner race 1 is altered, it is only required to employ the projections 8 corresponding to the altered height, without any necessity for changing the cage itself. Furthermore, in the case where the projections 6 are not integrally combined with the annular connecting portion 4a at the large diameter side of the cage 4, there may also be available such an effect that the cage 4 can be commonly used for the conventional tapered roller bearing of a type in which a small shoulder is provided at the small diameter portion of the inner race.

In a further embodiment as shown in FIGS. 5 and 6, the projections 9 of the cage 4 are provided at the inner diameter side of the large diameter side annular connecting portion 4a of the cage 4. By this construction, the length of the projection 9 is reduced for an increased rigidity, and an improved engagement between the forward ends 9a and the peripheral stepped portion 7 may be readily achieved.

FIGS. 7 and 8 show still another embodiment in which the inner and outer faces of the projection 11 are formed by folded faces including a plurality of flat faces 12, ---, 12 at the cross section in the axial direction of the cage. The above structure is advantageous in that the manufacture of a metallic mold for molding the cage is facilitated.

Figure 10:
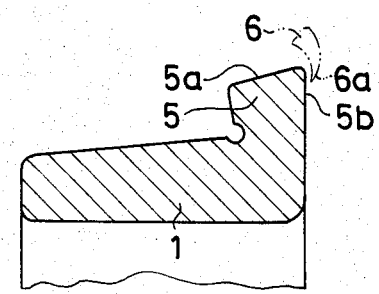
Figure 11:
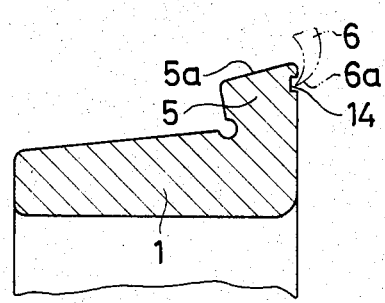

In still further embodiments of FIGS. 9, 10 and 11 respectively showing modifications of the engaging portion provided in the inner race 1 for engagement with the forward ends 6a of the projections 6 for the cage 4, the arrangement of FIG. 9 uses a peripheral groove 13 provided on the outer peripheral face 5a of the shoulder 5, as the engaging portion. In the construction of FIG. 10, the side face 5b of the shoulder 5 is employed as the engaging portion. Meanwhile, in the modification of FIG. 11, a peripheral groove 14 provided in the side face 5b of the shoulder 5 is utilized as the engaging portion.

Figure 12:
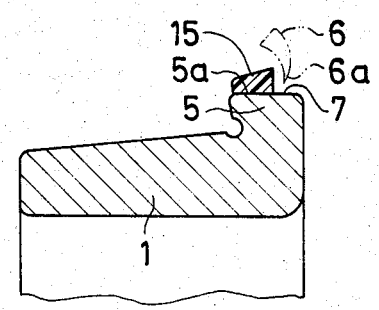

FIG. 12 shows still another construction in which the amount of engagement of the forward ends 6a of the projections 6 of the cage 4 at the engaging portion is arranged to be increased. In this construction, the outer peripheral face 5a of shoulder 5 is formed into a cylindrical face which is parallel with the axis, and a tapered annular member 15 having its diameter gradually increasing from the inner side of the bearing towards the outer side thereof is fixedly fitted onto said outer peripheral face 5a so that the peripheral stepped portion 7 is formed at the outer end portion of said shoulder 5.

According to the present invention, each of the projections formed at the large diameter side annular portion of the cage is formed, at its forward end, to be folded radially and inwardly, with the width and thickness of said forward end being gradually reduced from its base towards the tip, while the peripheral portion of said shoulder is formed into the inclined surface, with its diameter being increased from the inner side of the bearing towards the outer side thereof. Therefore, in the case where the cage with the tapered rollers and the inner race are to be assembled with each other, the forward ends of said projections are readily and smoothly deformed along said inclined surface, and thus, the forward ends of said projections may be easily engaged with the engaging portion of said shoulder without any resistance for facilitation of the assembly work, while the forward ends of the projections are almost free from any possibility of breakage.

Moreover, since the shoulder outer peripheral portion of the inner race is formed into the inclined surface directed from the inner side of the bearing towards the outer side so as to provide the engaging portion at the portion where the thickness of the shoulder is large, it is possible to maintain the same shoulder height as the conventional type bearing in which the shoulders are provided respectively at the large diameter portion and the small diameter portion of the inner race, and consequently, undesirable reduction of strength for the shoulder can be prevented.

Furthermore, even in the case where the forward ends of the projections and the inclined surface of the shoulder should contact each other due to shrinkage of the cage arising from circumstantial changes in temperatures and humidities, since the forward end of the projection is formed, in its width, to be very small as compared with the base portion, the contact area is extremely small to provide a state of light contact, with almost no increase in the rotational torque of the bearing.

Another advantage of the present invention is such that, in the case where the tapered rollers are subjected to an automatic assembling from the inner diameter side of the cage, the respective tapered rollers one inserted from the large diameter side of the cage in the axial direction, and in this case, since the projection of the cage is formed, in its width, to be gradually decreased from the base portion to the forward end so as to be pointed towards the tip, the respective tapered rollers may be moved through between the respective projections without any interference with respect to the projections even when the interval between the projections in the circumferential direction is decreased. Accordingly, the number of pockets for holding the tapered rollers may be increased for a consequent increase in the number of tapered rollers so as to enlarge the rated load of the bearing.

What is claimed is:

1. In a tapered roller bearing including an inner race and an outer race respectively having a first tapered track and a second tapered track, a plurality of tapered rollers disposed between said inner race and said outer race, and held in circumferentially equally spaced positions by a cage made of a synthetic resin, a shoulder for guiding the tapered rollers, provided only at a large diameter portion of said inner race, and projections for engagement with said shoulder, formed on a large diameter side annular portion of said cage at portions thereof corresponding to its positions between windows for the tapered rollers, the improvement comprising;

said cage having the projections each formed on the large diameter side annular portion thereof in such a shape as is folded radially and inwardly at its forward end portion, with a width and a thickness of said projection being gradually reduced from its base towards said forward end portion to provide a pointed shape, said inner race having the shoulder formed into an inclined surface, with its diameter being increased from an inner side of the bearing towards its outer side, and an engaging portion formed in said shoulder for engagement with said projections, whereby the forward ends of said projections are engaged with said engaging portion so as to maintain non-contact with respect to said shoulder during rotation of the bearing.

2. A tapered roller bearing as claimed in claim 1, wherein said projections are integrally formed with the large diameter side annular portion of said cage.

3. A tapered roller bearing as claimed in claim 1, wherein said projections are formed as separate members from the large diameter side annular portion of said cage, and subsequently combined into one unit with said large diameter side annular portion.

4. A tapered roller bearing as claimed in claim 1, wherein each of said projections is formed, at its inner and outer faces, into curved faces formed by arcs at a cross section in an axial direction of said cage.

5. A tapered roller bearing as claimed in claim 1, wherein each of said projections is formed, at its inner and outer faces, into bent faces formed by a plurality of planes at a cross section in an axial direction of said cage.

6. A tapered roller bearing as claimed in claim 1, wherein base portions of said projections are commonly used as the large diameter side annular portion of said cage.

7. A tapered roller bearing as claimed in claim 1, wherein said projections are provided at an outer side of the large diameter side annular portion of said cage.

8. A tapered roller bearing as claimed in claim 1, wherein said projections are provided at an inner diameter portion of the large diameter side annular portion of said cage.

9. A tapered roller bearing as claimed in claim 1, wherein the inclined surface at the shoulder of said inner race is formed by causing the outer peripheral face itself of said shoulder to be inclined.

10. A tapered roller bearing as claimed in claim 1, wherein said engaging portion is formed by a peripheral stepped portion provided at an outer shoulder portion of an outer peripheral face of the shoulder of said inner race.

11. A tapered roller bearing as claimed in claim 1, wherein said engaging portion is formed by a peripheral groove provided at an outer peripheral face of the shoulder of said inner race.

12. A tapered roller bearing as claimed in claim 1, wherein said engaging portion is formed by a side face of the shoulder of said inner race.

13. A tapered roller bearing as claimed in claim 1, wherein said engaging portion is formed by a peripheral groove provided in a side face of the shoulder of said inner race.

14. A tapered roller bearing as claimed in claim 1, wherein said shoulder is formed, at its outer peripheral face, into a cylindrical face directed in parallel with its axis, and a tapered annular member having its diameter increasing from the inner side of the bearing towards its outer side is fixedly fitted onto said outer peripheral face so that a peripheral stepped portion is formed at an outer end portion of said shoulder, whereby said outer peripheral surface of said tapered annular member is adapted to be the inclined surface of the outer peripheral portion of said shoulder, with said peripheral stepped portion being used as the engaging portion.

* * * * *